US012615479B2

(12) United States Patent
Hui et al.

(10) Patent No.: US 12,615,479 B2
(45) Date of Patent: Apr. 28, 2026

(54) SPEAKER

(71) Applicant: AAC Microtech (Changzhou) Co., Ltd., Changzhou (CN)

(72) Inventors: Yao Hui, Changzhou (CN); Kaiqi Zhou, Changzhou (CN); Weimin Chen, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 176 days.

(21) Appl. No.: 18/747,395

(22) Filed: Jun. 18, 2024

(65) Prior Publication Data

US 2025/0324205 A1 Oct. 16, 2025

Related U.S. Application Data

(63) Continuation of application No. PCT/CN2024/087752, filed on Apr. 15, 2024.

(51) Int. Cl.

| | |
|---|---|
| ***H04R 11/02*** | (2006.01) |
| ***H04R 7/04*** | (2006.01) |
| ***H04R 7/18*** | (2006.01) |
| ***H04R 9/02*** | (2006.01) |

(52) U.S. Cl.
CPC ............... *H04R 11/02* (2013.01); *H04R 7/04* (2013.01); *H04R 7/18* (2013.01); *H04R 2400/07* (2013.01)

(58) Field of Classification Search
CPC . H04R 11/02; H04R 7/04; H04R 7/18; H04R 2400/07; H04R 9/025
USPC ......................................... 381/398, 150, 396
See application file for complete search history.

(56) References Cited

U.S. PATENT DOCUMENTS

2019/0261078 A1* 8/2019 Ouchi .................. H04R 1/1016
2022/0279280 A1* 9/2022 Liu .......................... H04R 9/06

* cited by examiner

*Primary Examiner* — Thjuan K Addy
(74) *Attorney, Agent, or Firm* — Wiersch Law Group

(57) ABSTRACT

The present invention provides a speaker including a housing and a moving iron assembly. The moving iron assembly includes a first magnetic structure and a second magnetic structure, a magnetic induction diaphragm that has a suspension, a first moving iron unit and a second moving iron unit located inside the suspension, and a first coil and a second coil. The side where the first coil and the second coil are away from each other respectively correspond to the first magnetic structure and the second magnetic structure. Compared with the prior art, the magnetic flux control of the moving iron assembly circuit of the speaker is strong, and the driving force is improved.

10 Claims, 6 Drawing Sheets

SPEAKER

TECHNICAL FIELD

The present invention relates to the field of electroacoustic transduction technology, more particularly to a speaker.

BACKGROUND

With the advent of the mobile internet era, speakers are widely used in portable electronic devices such as smartphones, laptops, etc. With the rapid development of these portable electronic devices and the increasing functional requirements of people, the speakers used on them are also developing rapidly. In addition, as the development of thin and light mobile phones requires, the quality requirements for the micro speakers used in them are also getting higher. Since the speaker serves as a playback device for voice functions, the size of the speaker's rear cavity is directly related to the improvement of the product's acoustic performance.

In relevant technologies, existing speakers include a housing, a moving iron mounted on the housing, and a moving iron assembly system for driving the vibration of the moving iron. The moving iron assembly system consists of a magnet and a coil, which generate a magnetic field that interacts with the magnet to drive the vibration of the moving iron assembly when the coil is energized. However, the coil is rigidly integrated with the moving iron and cannot achieve a large amplitude on its own. It can only achieve amplitude driving through a cantilever beam and connection shaft. The magnets are staggered and placed on both sides of the coil, increasing the overall height due to the high height of the coil and magnet themselves after being stacked, thereby limiting the ultimate thinness of the overall speaker and resulting in poor user experience. Additionally, since the single moving iron and moving iron assembly system only achieve single-ended drive, without forming moving iron assembly linkage, there is a large amplitude attraction and poor driving effect.

Therefore, it is necessary to provide a new speaker to address the technical issues mentioned above.

SUMMARY

The purpose of the present invention is to provide a speaker that can achieve magnetic flux control of the moving iron assembly circuit, with high driving force, and the dynamic iron body can achieve balanced drive at both ends.

To achieve the above purpose, the present invention provides a speaker which comprises a housing and a moving iron assembly fixed in the housing.

The moving iron assembly includes a first magnetic structure and a second magnetic structure which are fixed at two ends of the housing and spaced apart from each other; a magnetic conductive diaphragm having a suspension, a first movable iron unit and a second movable iron unit located inside the suspension, the first movable iron unit and the second movable iron unit being located on one side of the housing and horizontally spaced apart; an outer peripheral edge of the suspension being fixed to the first magnetic structure and the second magnetic structure, and an inner peripheral edge of the suspension being fixed to the outer peripheral edges of the first movable iron unit and the second movable iron unit respectively; the first magnetic structure and the second magnetic structure being magnetized along a vibration direction of the magnetic conductive diaphragm for jointly driving the magnetic conductive diaphragm to vibrate and produce sound; and, a first coil and a second coil which are respectively spaced to surround the first movable iron unit and the second movable iron unit; the first coil being horizontally opposite to the second coil.

A side of the first coil and a side of the second coil which are away from each other is respectively corresponding to the first magnetic structure and the second magnetic structure; another side of the first coil and another side of the second coil which are closed to each other forms a sound outlet.

As an improvement, the speaker further comprises a first magnetic conductive plate, a second magnetic conductive plate opposed to the first magnetic conductive plate, a third magnetic conductive plate, and a fourth magnetic conductive plate opposed to the third magnetic conductive plate. The first magnetic conductive plate and the second magnetic conductive plate are respectively attached fixedly to one side of the first coil and the second coil away from the housing, and the third magnetic conductive plate and the fourth magnetic conductive plate are respectively attached fixedly to one side of the first coil and the second coil closer to the housing; the first coil is fixed to the first magnetic structure via the third magnetic conductive plate, and the second coil is fixed to the second magnetic structure via the fourth magnetic conductive plate.

As an improvement, the speaker further comprises a first magnetic conductive elastic plate, a second magnetic conductive elastic plate, and a non-magnetic conductive support member, wherein one end of the first magnetic conductive elastic plate is fixed to one side of the housing away from the third magnetic conductive plate; one end of the second magnetic conductive elastic plate is fixed to one side of the housing away from the fourth magnetic conductive plate; the other end of the first magnetic conductive elastic plate and the other end of the second magnetic conductive elastic plate are fixed to the non-magnetic conductive support member on a side close to the housing; and a side of the non-magnetic conductive support member away from the housing is adhered and fixed to the first movable iron unit and the second movable iron unit on the sides close to the housing.

As an improvement, the first magnetic structure comprises a U-shaped first magnetic conductive piece, a first magnet and a second magnet fixed on the first magnetic conductive piece and arranged opposite to each other; the first movable iron unit at least partially locates between the first magnet and the second magnet; and a side of the first coil away from the second coil corresponds to the first magnet and the second magnet respectively.

The second magnetic structure includes a U-shaped second magnetic conductive piece, a third magnet and a fourth magnet which are fixed on the second magnetic conductive piece respectively; the second movable iron unit at least partially locates between the third magnet and the fourth magnet; a side of the second coil away from the first coil respectively corresponds to the third magnet and the fourth magnet; and an opening direction of the first magnetic conductive piece is opposite to an opening direction of the second magnetic conductive piece.

As an improvement, the first coil locates within the first magnetic conductive piece, and the second coil locates within the second magnetic conductive piece.

As an improvement, a magnetization direction of the first magnet is the same as that of the second magnet, and a magnetization direction of the third magnet is the same as that of the fourth magnet; the magnetization direction of the first magnet is opposite to that of the third magnet.

As an improvement, the speaker further comprises two suction compensation mechanisms arranged opposite to each other, wherein the two suction compensation mechanisms are fixed at both ends of the housing, and the two suction compensation mechanisms respectively corresponds to the first magnetic structure and the second magnetic structure.

As an improvement, the suction compensation mechanism comprises an U-shaped fixing piece separated by the first magnetic structure, a central magnet fixed to the fixing piece, a magnetic conductive connecting piece fixed to the central magnet near one side of the first magnetic structure, and a fifth and a sixth magnets fixed respectively to the fixing piece and spaced apart and aligned with each other; the fifth and sixth magnets are located on both sides of the central magnet, the magnetic conductive connecting piece passes through the first magnetic structure and is fixedly connected to the magnetic diaphragm; a magnetization direction of the central magnet is opposite to the magnetization direction of the fifth magnet and the magnetization direction of the sixth magnet.

As an improvement, the speaker further comprises a first magnetic conductive element and a second magnetic conductive element, wherein the first magnetic conductive element is laminated and fixed to one end of the first moving iron unit near the first magnetic structure, the second magnetic conductive element is laminated and fixed to one end of the second moving iron unit near the second magnetic structure; the first magnetic conductive element, the second magnetic conductive element, the first moving iron unit, and the second moving iron unit cooperatively form a dumbbell-shaped structure.

As an improvement, the speaker further comprises a third magnetic conductive element perpendicular to the first movable iron unit, and a fourth magnetic conductive element perpendicular to the second movable iron unit, wherein the third magnetic conductive element locates between the first coil and the first magnetic structure, the fourth magnetic conductive element locates between the second coil and the second magnetic structure; the third magnetic conductive element and the first movable iron unit together form a cross structure; and the fourth magnetic conductive element and the second movable iron unit together form another cross structure.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

Figure 1:
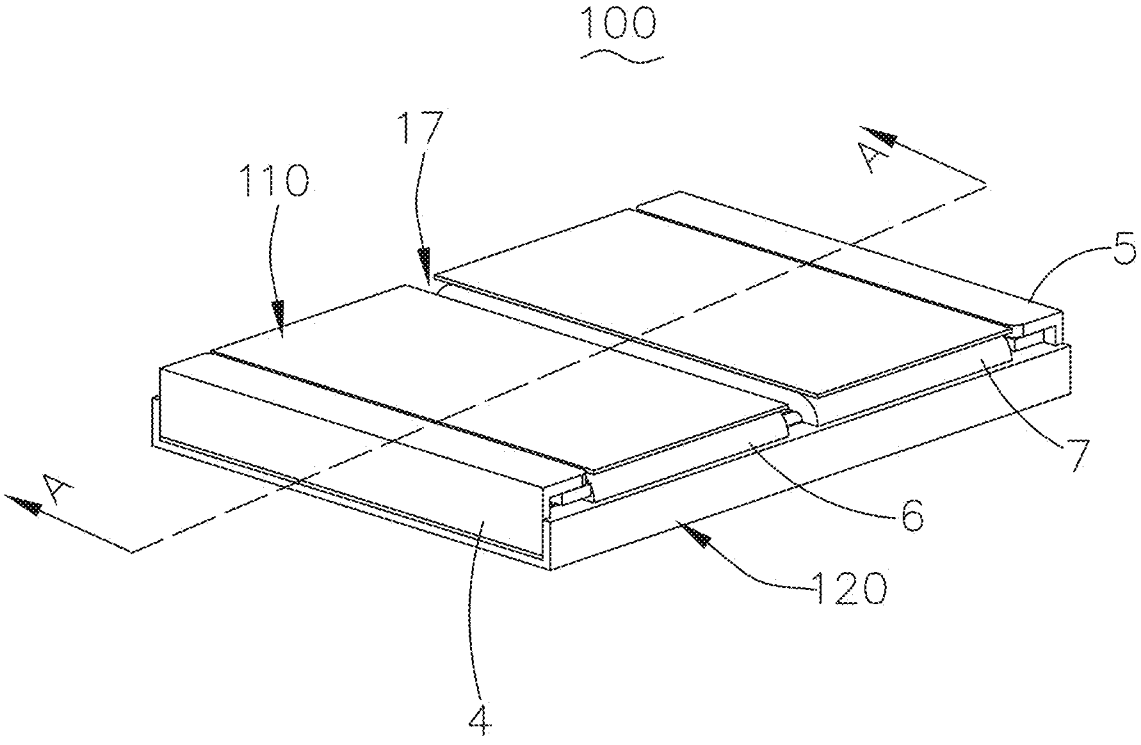
FIG. 1 is an isometric view of a speaker in accordance with an embodiment of the present invention.
Figure 2:
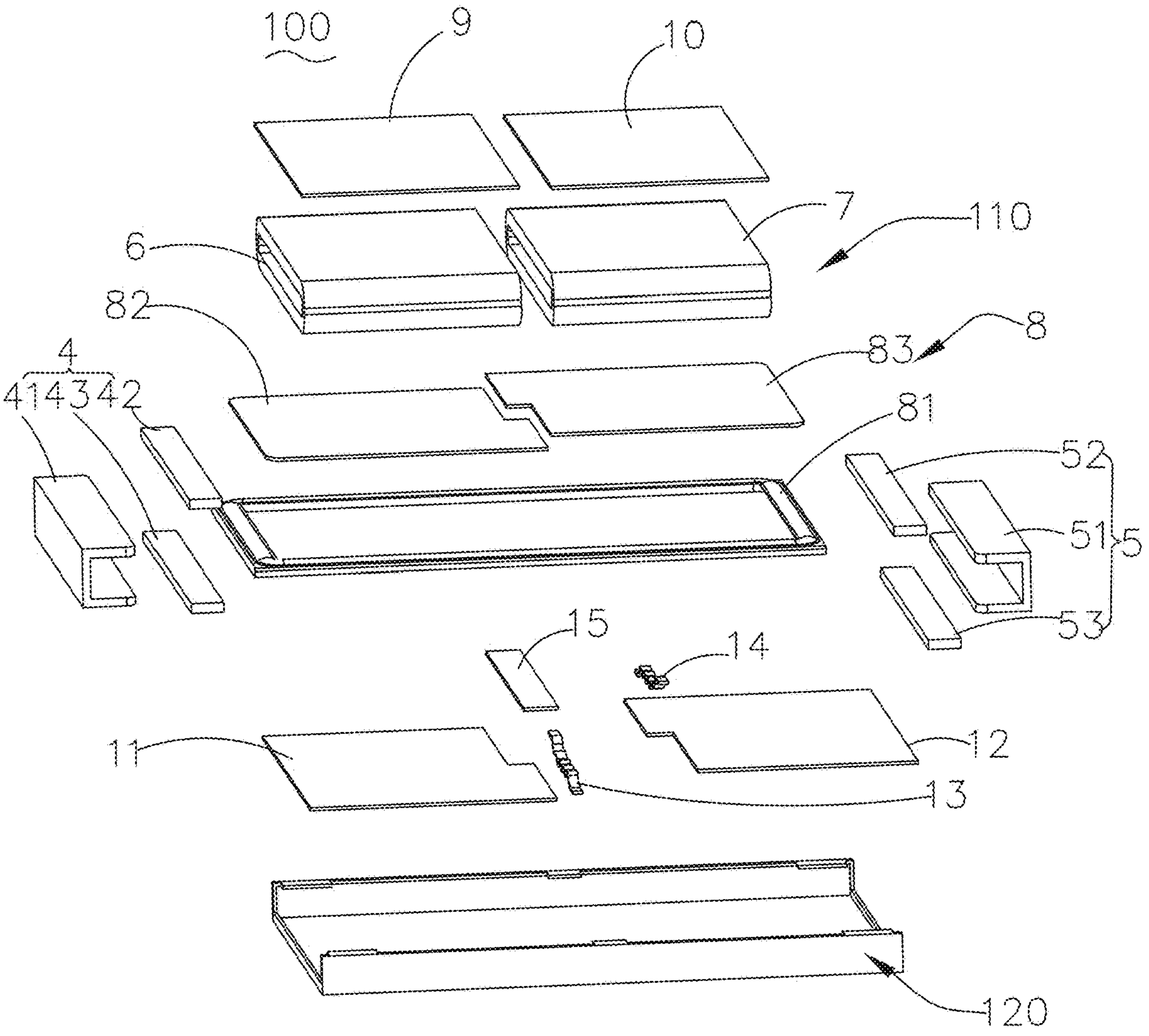
FIG. 2 is an exploded view of the speaker in FIG. 1.
Figure 3:
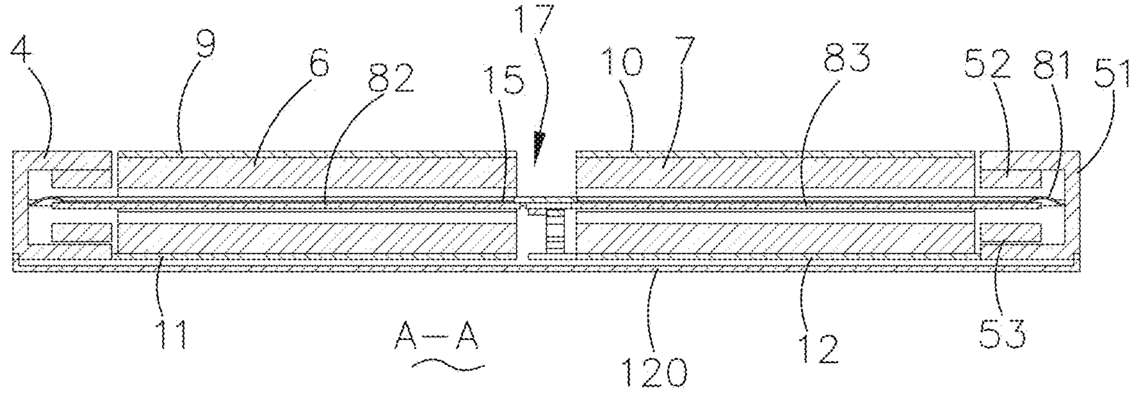
FIG. 3 is a cross-sectional view of the speaker taken along line A-A in FIG. 1.
Figure 4:
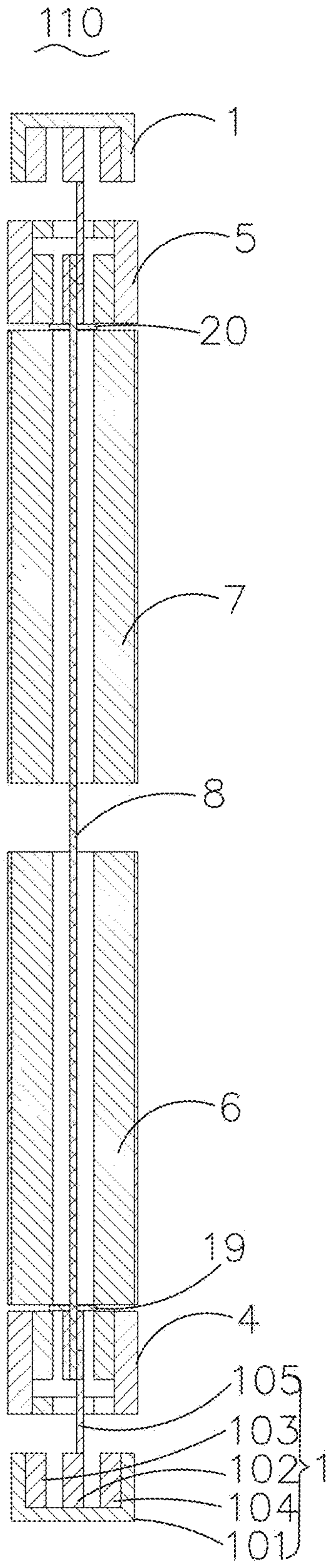
FIG. 4 is an illustration of the cross-shaped structure of a moving iron assembly of the speaker of the embodiment of the present embodiment.
Figure 5:
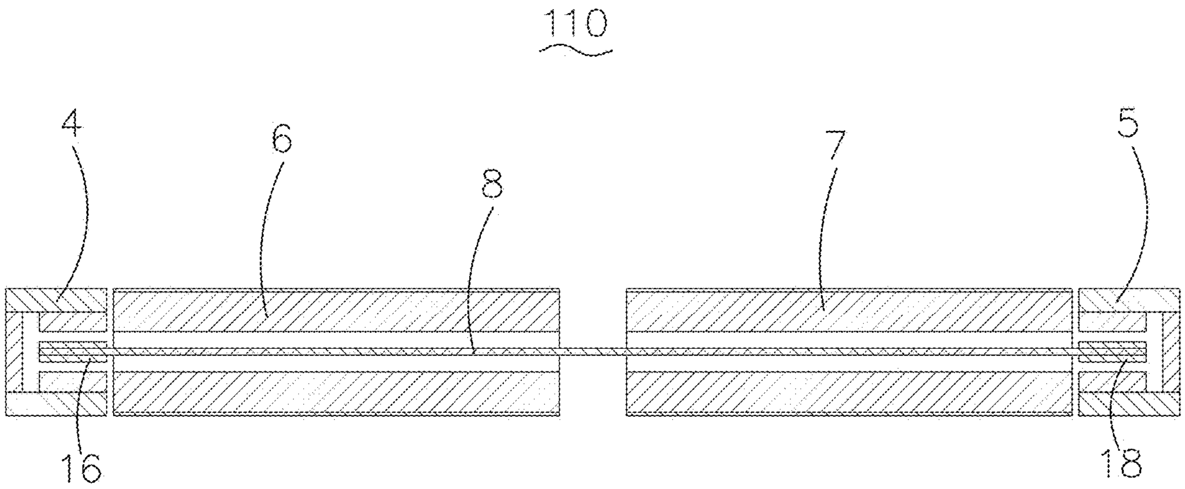
FIG. 5 is an illustration of a dumbbell-shaped structure of the moving iron assembly.
Figure 6:
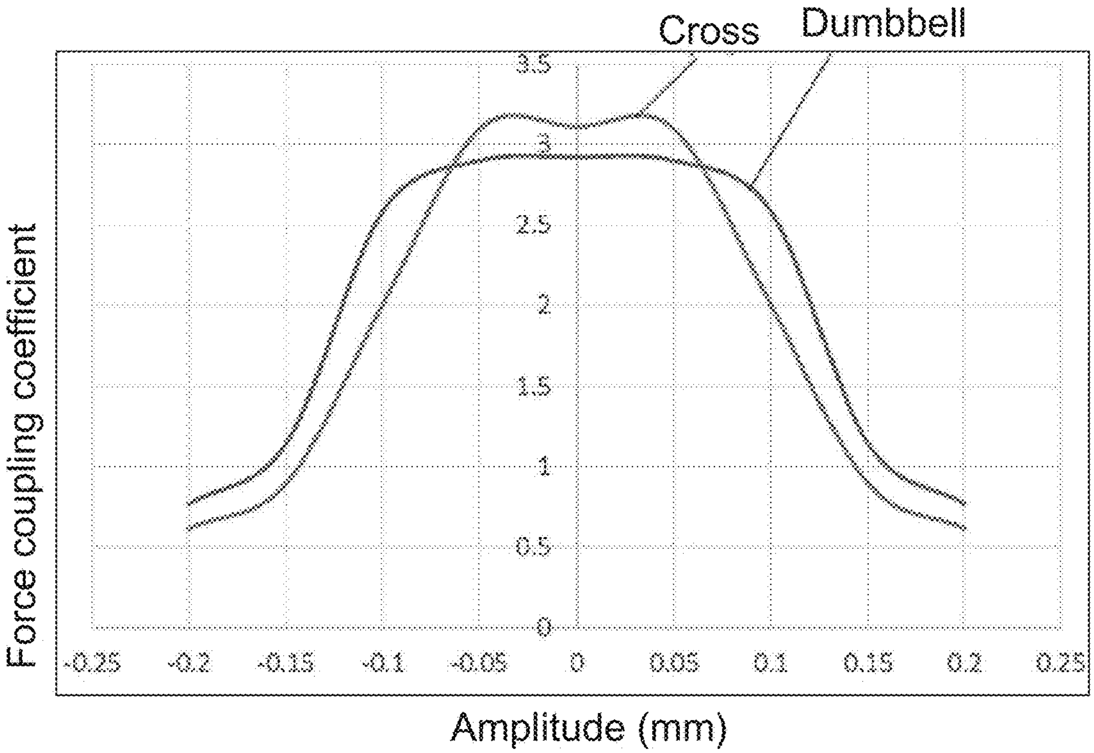
FIG. 6 is the BL curve of FIG. 5.
Figure 7:
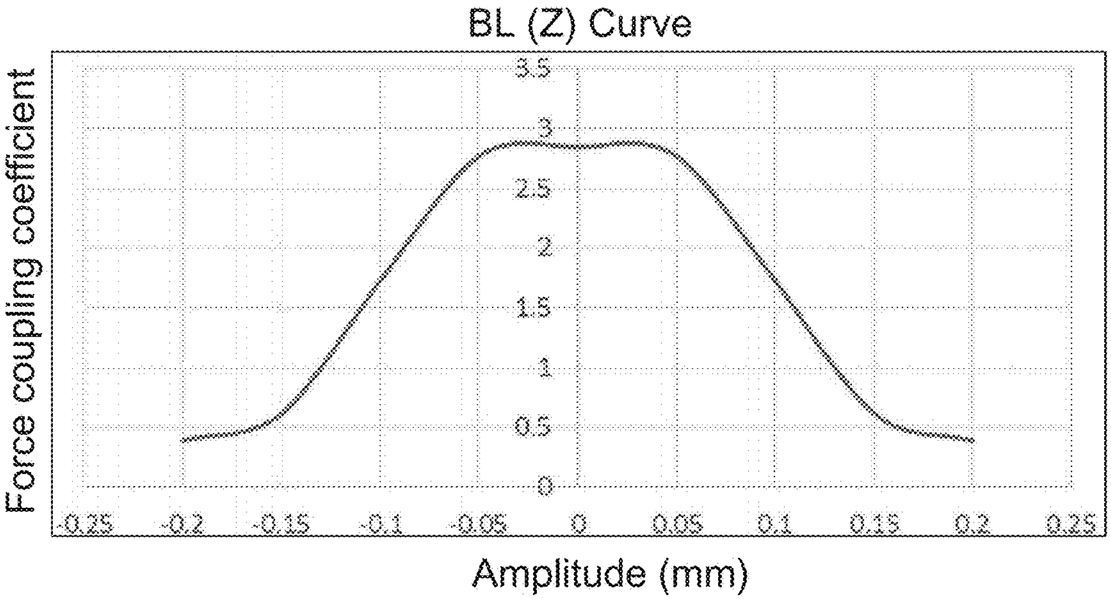
FIG. 7 is the BL (z) curve diagram of the moving iron assembly.
Figure 8:
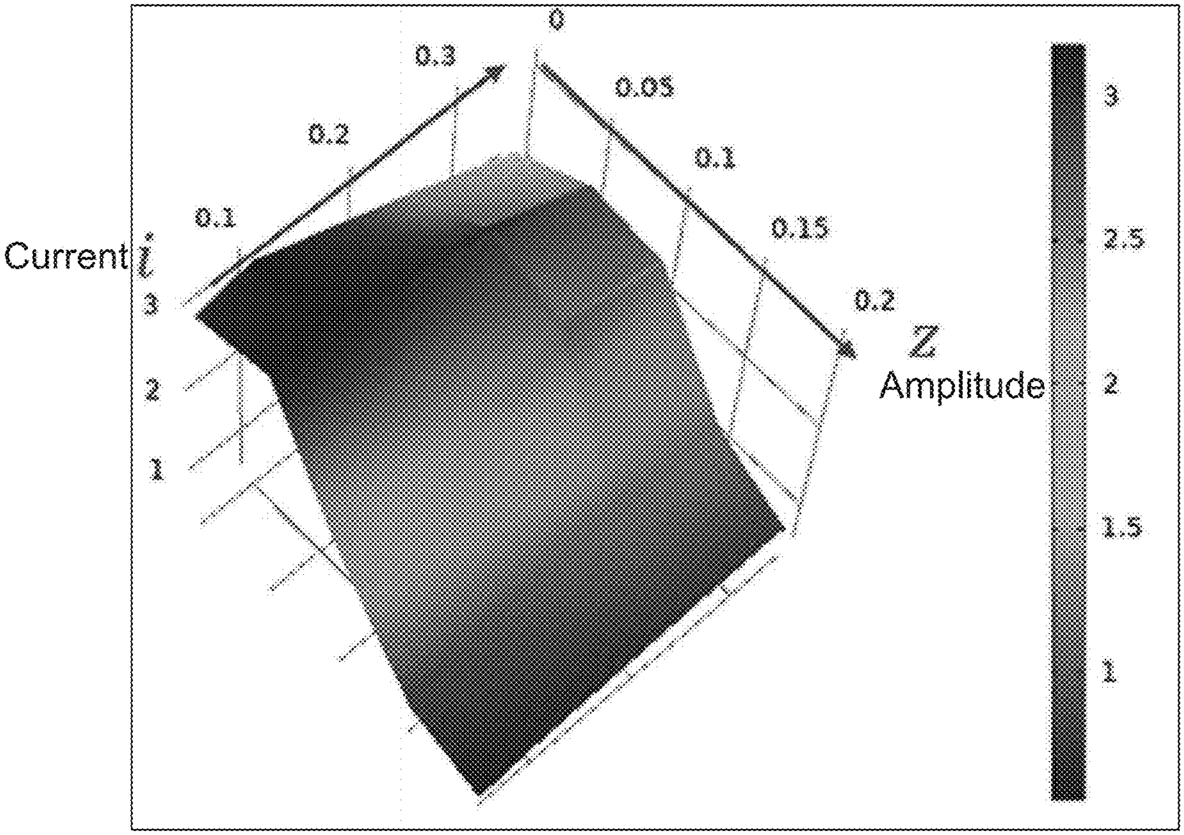
FIG. 8 shows the performance simulation diagram of the moving iron assembly in FIG. 8.
Figure 9:
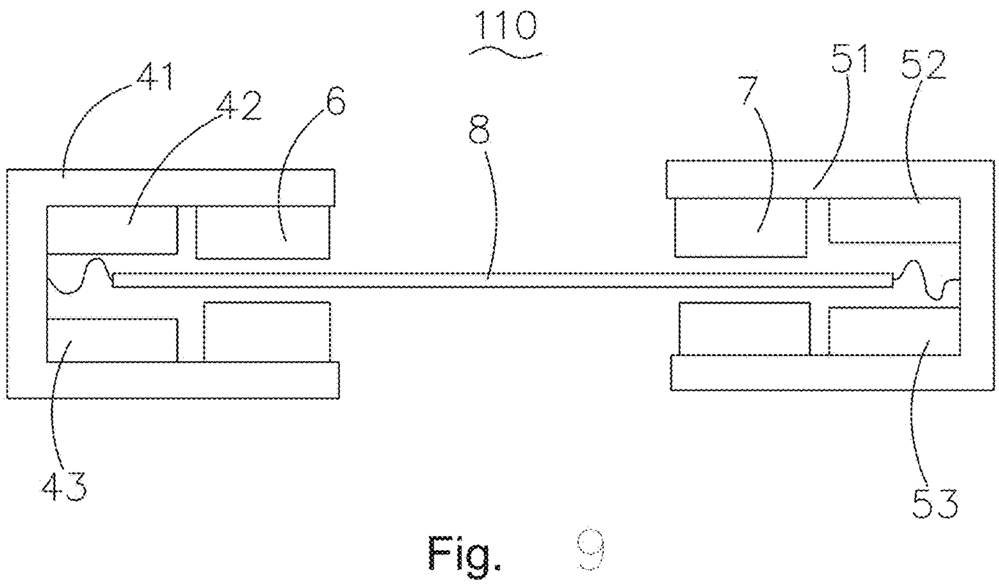
FIG. 9 is illustrates a moving iron assembly of the speaker.

Referring to FIGS. 1-9, an embodiment of the present invention provides a speaker 100, comprising a housing 120 and a moving iron assembly 110 fixed to the housing 120. The moving iron assembly 110 includes a first magnetic structure 4, a second magnetic structure 5, a first coil 6, a second coil 7, and a magnetic conductive diaphragm 8.

The first magnetic structure 4 and the second magnetic structure 5 are relatively fixed on one side of the housing 120, and the first magnetic structure 4 and the second magnetic structure 5 are located at the two ends of the housing 120 and spaced from each other. The opening direction of the first magnetic structure 4 is opposite to the opening direction of the second magnetic structure 5. For example, placing the first magnetic structure 4 on the left side of the housing 120, and the second magnetic structure 5 on the right side of the housing 120, so that the initial position of the first movable iron unit 82 and the second movable iron unit 83 is in the central position of magnetic attraction balance.

Optional, the first magnetic structure 4 and the second magnetic structure 5 are arranged symmetrically or asymmetrically.

The magnetic conductive diaphragm 8 comprises a suspension 81 and a first moving iron unit 82 and a second moving iron unit 83 located within the suspension 81. The first moving iron unit 82 and the second moving iron unit 83 are respectively located on one side of the housing and are horizontally spaced apart; the outer peripheral edge of the suspension 81 is fixedly connected to the first magnetic structure 4 and the second magnetic structure 5, and the inner peripheral edge of the suspension 81 is fixedly connected to the outer peripheral edge of the first moving iron unit 82 and the outer peripheral edge of the second moving iron unit 83. The first magnetic structure 4 and the second magnetic structure 5 are magnetized along the vibration direction of the magnetic conductive diaphragm 8 in parallel and jointly drive the magnetic conductive diaphragm 8 to vibrate and produce sound.

The magnetic flux membrane 8 is annularly structured, with an outer periphery of the magnetic flux membrane 8 fixed to the first magnetic structure 4 and the second magnetic structure 5 respectively, and the inner periphery of the magnetic flux membrane 8 fixed to the outer periphery of the first movable iron unit 82 and the second movable iron unit 83 respectively. The magnetic field generated by the first coil 6 and the second coil 7 respectively interacts with the first magnetic structure 4 and the second magnetic structure 5 to drive the vibration of the magnetic flux membrane 8, emitting sound from the sound outlet 17, providing a good user experience.

In this embodiment, the structure of the first moving iron unit 82 is the same as that of the second moving iron unit 83. The first moving iron unit 82 comprises a rectangular main body and a rectangular protrusion extending from one side of the rectangular main body.

In this embodiment, the first coil 6 and the second coil 7 are respectively spaced to surround the first movable iron unit 82 and the second movable iron unit 83; the first coil 6 and the second coil 7 are positioned in a facing relationship with each other in a watertight manner, with the side away from each other corresponding to the first magnetic structure 4 and the second magnetic structure 5. On the side where the first coil 6 and the second coil 7 are close to each other, a sound outlet 17 is formed by being spaced apart from each other. By energizing the first coil 6 and the second coil 7, the magnetic fields formed by the first magnetic structure 4 and the second magnetic structure 5 with the first coil 6 and the second coil 7 respectively cause the first movable iron unit 82 and the second movable iron unit 83 to generate opposing polarities, generating biased magnetic attraction with the first magnetic structure 4 and the second magnetic structure 5, and the magnetic attraction is related to the positions of the first movable iron unit 82 and the second movable iron unit 83 with respect to the currents in the first coil 6 and the second coil 7.

The sound outlet 17 can also form a gap with the first coil 6 and the first movable iron unit 82 or with the second coil 7 and the second movable iron unit 83.

The position of the outlet port 17 can be between the first coil 6 and the second coil 7; the position of the outlet port 17 can also be between the first coil 6 and the first magnetic structure 4, or between the second coil 7 and the second magnetic structure 5.

The loudspeaker 100 as described in the present implementation further includes a first magnetic conductive plate 9 and a second magnetic conductive plate 10 arranged in a relative manner, as well as a third magnetic conductive plate 11 and a fourth magnetic conductive plate 12 arranged in a relative manner. The first magnetic conductive plate 9 and the second magnetic conductive plate 10 are respectively attached fixedly to one side of the first coil 6 and the second coil 7 away from the housing 120, the third magnetic conductive plate 11 and the fourth magnetic conductive plate 12 are respectively attached fixedly to one side of the first coil 6 and the second coil 7 close to the housing 120, the first coil 6 is fixed to the first magnetic structure 4 by the third magnetic conductive plate 11, and the second coil 7 is fixed to the second magnetic structure 5 by the fourth magnetic conductive plate 12. The first magnetic conductive plate 9 and the third magnetic conductive plate 11 are used to improve the magnetic guiding performance of the first coil 6, and the second magnetic conductive plate 10 and the fourth magnetic conductive plate 12 are used to improve the magnetic guiding performance of the second coil 7. Optionally, the first magnetic conductive plate 9, the second magnetic conductive plate 10, the third magnetic conductive plate 11, and the fourth magnetic conductive plate 12 are all in a magnetic guide sheet structure.

In this embodiment, the speaker 100 further comprises a first magnetic guide piece 13, a second magnetic guide piece 14, and a non-magnetic connecting support 15. One end of the first magnetic guide piece 13 is fixed to one side of the third magnetic piece 11 away from the housing 120, and one end of the second magnetic guide piece 14 is fixed to one side of the fourth magnetic piece 12 away from the housing 120. The other ends of the first magnetic guide piece 13 and the second magnetic guide piece 14 are fixed to the non-magnetic connecting support 15 near the housing 120 on one side, and the non-magnetic connecting support 15 on the side away from the housing 120 is respectively adhered and fixed to the first movable iron unit 82 and the second movable iron unit 83 near the housing 120.

In the present embodiment, the first magnetic structure 4 includes a U-shaped first magnetically conductive material component 41, a first magnet 42 and a second magnet 43 fixed on the first magnetically conductive material component 41 and arranged opposite to each other with a gap, the first movable iron unit 82 is at least partially located between the first magnet 42 and the second magnet 43, the first coil 6 is arranged on the side away from the second coil 7 and is respectively corresponding to the first magnet 42 and the second magnet 43. The second magnetic structure 5 includes a U-shaped second magnetically conductive material component 51, a third magnet 52 and a fourth magnet 53 fixed on the second magnetically conductive material component 51 and arranged opposite to each other with a gap, the second movable iron unit 83 is at least partially located between the third magnet 52 and the fourth magnet 53, the second coil 7 is arranged on the side away from the first coil 6 and is respectively corresponding to the third magnet 52 and the fourth magnet 53; the opening direction of the first magnetically conductive material component 41 is opposite to the opening direction of the second magnetically conductive material component.

The driving force is highly nonlinear. When the amplitude is large, the attraction of the first magnet 42 and the second magnet 43 to the first moving iron unit 82 is greater than the driving force brought by the first coil 6; By adding soft magnetic at the bottom, achieving magnetic flux closure; The soft magnetic has elastic first magnetic guiding piece 13 and second magnetic guiding piece 14, achieving low stiffness while having good magnetic guiding capability; The ball top is composed of the first moving iron unit 82, the second moving iron unit 83, and a non-magnetic connecting support 15, where the non-magnetic piece is used to connect the two sides of the first moving iron unit 82 and the second moving iron unit 83 to form the ball top. By setting up a component ball top, double-drive module, with a complete magnetic circuit, high driving efficiency is achieved.

The winding methods of the first coil 6 and the second coil 7 are in a flat state, the first coil 6 is respectively attached to the first magnet 42 and the second magnet 43, and the second coil 7 is respectively attached to the third magnet 52 and the fourth magnet 53.

Optional, the first magnet 42 and the second magnet 43 on one side are set in an up-down magnet configuration, which can have the same size or different sizes to achieve nonlinear control. The third magnet 53 and the fourth magnet 53 on one side are set in an up-down magnet configuration, which can have the same size or different sizes to achieve nonlinear control.

In this embodiment, the magnetic conductive diaphragm 8 is a composite ring made of soft magnetic materials or a combination of polymer film and soft magnetic materials; after the first movable iron unit 82 and the second movable iron unit 83 are connected to the first magnetic structure 4 and the second magnetic structure 5 on both sides, the magnetic attraction on one side is significantly reduced, which will lead to a certain degree of decrease in the BL value, but it can enhance the magnetic circuit's attraction suppression capability; the ring 81 can also be replaced by two pieces of foam with high magnetic permeability, which are placed between the first magnet 42 and the first movable iron unit 82, and the third magnet 52 and the second movable iron unit 83.

After the work, the magnetic field generated by energizing the first coil 6 moves in the direction near the housing 120, causing the magnetic lines not to pass through the lower air gap under the first moving iron unit 82, resulting in a weakening of the force of the lower half of the magnet on the moving iron.

Optional, the toroid 81 can be made of flexible magnetic material.

In this embodiment, the first coil 6 is placed inside the first magnetic conductive piece 41, and the second coil 7 is placed inside the second magnetic conductive piece 51. By saving the installation space of the first coil 6 and the second coil 7, the speaker 100 can achieve better thinning.

Optional, the first coil 6 is placed in the space formed by the first magnetic guiding member 41, the second coil 7 is placed in the second magnetic guiding member 51, and the magnetic conductive diaphragm 8 is integrated with the first movable iron unit 82 and the second movable iron unit 83, making it easier to achieve the design of the central control area of the moving iron assembly pathway.

In this implementation, the magnetization direction of the first magnet 42 is the same as that of the second magnet 43, and the magnetization direction of the third magnet 52 is the same as that of the fourth magnet 53; the magnetization direction of the first magnet 42 is opposite to that of the third magnet 52. The end of the first magnet 42 away from the housing 120 is the S pole, and the end of the first magnet 42 close to the housing 120 is the N pole, the end of the third magnet 52 away from the housing 120 is the N pole, and the end of the third magnet 52 close to the housing 120 is the S pole. The first moving iron unit 82 is set with one end of the first magnet 42 and the second magnet 43 as the N pole, and the second moving iron unit 83 is set with one end of the third magnet 52 and the fourth magnet 53 as the S pole.

The loudspeaker 100 of the present embodiment further comprises two suction compensation mechanisms 1 relatively arranged, with two suction compensation mechanisms 1 respectively fixed at the two ends of the housing 120, and the two suction compensation mechanisms 1 correspondingly set to the first magnetic structure 4 and the second magnetic structure 5. In the case of excessive magnetic suction force under ultra-large amplitude and excessive magnetic resistance of the magnetic circuit gap, suction compensation mechanisms 1 are designed at both ends of the loudspeaker 100, and the magnetization direction of the magnet used in the compensation structure is opposite to the magnetization directions of the two magnets, the upper and lower first magnet 42 and the second magnet 43.

The suction compensating mechanism 1 comprises a U-shaped fixing member 101 spaced apart from the first magnetic structure, a central magnet 102 fixed on the fixing member 101, a magnetic connecting member 105 fixed to the central magnet 102 near one side of the first magnetic structure, and fifth magnet 103 and sixth magnet 104 fixed to the fixing member 101 and arranged opposite each other. The fifth magnet 103 and the sixth magnet 104 are located on both sides of the central magnet 102, and the magnetic connecting member 105 passes through the first magnetic structure and is fixedly connected to the magnetic diaphragm.

The magnetization direction of the central magnet 102 is opposite to the magnetization directions of the fifth magnet steel 103 and the sixth magnet steel 104.

The loudspeaker 100 of the present embodiment further comprises a first magnetic yoke 16 and a second magnetic yoke 18, the first magnetic yoke 16 being stacked and fixed to one end of the first movable iron unit 82 close to the first magnetic structure 4, the second magnetic yoke 18 being stacked and fixed to one end of the second movable iron unit 83 close to the second magnetic structure 5, the first magnetic yoke 16, the second magnetic yoke 18, the first movable iron unit 82, and the second movable iron unit 83 integrally forming a dumbbell-shaped structure.

The speaker 100 of the present implementation further includes a third magnet 19 and a fourth magnet 20, wherein the third magnet 19 is perpendicular to the first moving iron unit 82, the third magnet 19 is located between the first coil and the first magnetic structure 4. The fourth magnet 20 is perpendicular to the second moving iron unit 83, the fourth magnet 20 is located between the second coil and the second magnetic structure 5; the third magnet 19, the fourth magnet 20, the first moving iron unit 82, and the second moving iron unit 83 together form a cross-shaped structure.

The first moving iron unit 82 and the second moving iron unit 83 are configured in a dumbbell or cross structure. Both the first moving iron unit 82 and the second moving iron unit 83 are moving iron piece structures, where the two ends of the moving iron piece structure can be designed as dumbbell or cross shapes; at the same time, the moving iron piece structure can also have a convex-concave shape, not limited here. By designing the first moving iron unit 82 and the second moving iron unit 83 in a dumbbell shape, the force-electric coupling coefficient (BL value) is lower than that of the common elongated shape in the amplitude (Z) range of −0.05 to 0.05, and the BL curve at that time is higher than the BL curve of the common elongated shape.

Compared with existing technologies, in this speaker of the present invention, the first magnetic structure and the second magnetic structure are positioned at both ends of the housing and spaced apart; the first movable iron unit and the second movable iron unit are respectively positioned on one side of the housing and horizontally spaced apart; the outer peripheral edge of the diaphragm is fixed to the first magnetic structure and the second magnetic structure, and the inner peripheral edge of the diaphragm is fixed to the outer peripheral edges of the first movable iron unit and the second movable iron unit. The first magnetic structure and the second magnetic structure are magnetized along the vibration direction of the diaphragm parallel and jointly drive the diaphragm to vibrate and produce sound. The first coil and the second coil respectively wrap around the first movable iron unit and the second movable iron unit in intervals. The first coil and the second coil are horizontally arranged opposite to each other, with the side where they are away from each other corresponding to the first magnetic structure and the second magnetic structure. The side where they are close to each other forms a sound outlet at an interval. A set of moving iron assembly drive is formed by the first movable iron unit, the first coil, and the first magnetic structure, and another set of moving iron assembly drive is formed by the second movable iron unit, the second coil, and the second magnetic structure, thus achieving a separate design of the magnetic circuit and the drive section, facilitating the magnetic flux control of the moving iron assembly circuit. The separate design of the first movable iron unit and the second movable iron unit can achieve balanced drive at both ends, with good driving effect, high driving force, parallel vibration, direct drive, avoiding lever loss of driving force, and providing a better user experience.

The foregoing is merely illustrative of embodiments of the present invention, and it should be noted that modifications may be made to those skilled in the art without departing from the spirit of the invention but are intended to be within the scope of the invention.

What is claimed is:

1. A speaker, comprising a housing and a moving iron assembly fixed in the housing; the moving iron assembly including:

a first magnetic structure and a second magnetic structure which are fixed at two ends of the housing and spaced apart from each other;

a magnetic conductive diaphragm having a suspension, a first movable iron unit and a second movable iron unit located inside the suspension, the first movable iron unit and the second movable iron unit being located on one side of the housing and horizontally spaced apart; an outer peripheral edge of the suspension being fixed to the first magnetic structure and the second magnetic structure, and an inner peripheral edge of the suspension being fixed to the outer peripheral edges of the first movable iron unit and the second movable iron unit respectively; the first magnetic structure and the second magnetic structure being magnetized along a vibration direction of the magnetic conductive diaphragm for jointly driving the magnetic conductive diaphragm to vibrate and produce sound; and, a first coil and a second coil which are respectively spaced to surround the first movable iron unit and the second movable iron unit; the first coil being horizontally opposite to the second coil; wherein a side of the first coil and a side of the second coil which are away from each other is respectively corresponding to the first magnetic structure and the second magnetic structure; another side of the first coil and another side of the second coil which are closed to each other forms a sound outlet.

2. The speaker as described in the claim 1 further comprising a first magnetic conductive plate, a second magnetic conductive plate opposed to the first magnetic conductive plate, a third magnetic conductive plate, and a fourth magnetic conductive plate opposed to the third magnetic conductive plate; wherein the first magnetic conductive plate and the second magnetic conductive plate are respectively attached fixedly to one side of the first coil and the second coil away from the housing, and the third magnetic conductive plate and the fourth magnetic conductive plate are respectively attached fixedly to one side of the first coil and the second coil closer to the housing; the first coil is fixed to the first magnetic structure via the third magnetic conductive plate, and the second coil is fixed to the second magnetic structure via the fourth magnetic conductive plate.

3. The speaker as described in claim 2 further comprising a first magnetic conductive elastic plate, a second magnetic conductive elastic plate, and a non-magnetic conductive support member, wherein one end of the first magnetic conductive elastic plate is fixed to one side of the housing away from the third magnetic conductive plate; one end of the second magnetic conductive elastic plate is fixed to one side of the housing away from the fourth magnetic conductive plate; the other end of the first magnetic conductive elastic plate and the other end of the second magnetic conductive elastic plate are fixed to the non-magnetic conductive support member on a side close to the housing; and a side of the non-magnetic conductive support member away from the housing is adhered and fixed to the first movable iron unit and the second movable iron unit on the sides close to the housing.

4. The speaker as described in claim 1, wherein the first magnetic structure comprises a U-shaped first magnetic conductive piece, a first magnet and a second magnet fixed on the first magnetic conductive piece and arranged opposite to each other; the first movable iron unit at least partially locates between the first magnet and the second magnet; and a side of the first coil away from the second coil corresponds to the first magnet and the second magnet respectively;

the second magnetic structure includes a U-shaped second magnetic conductive piece, a third magnet and a fourth magnet which are fixed on the second magnetic conductive piece respectively; the second movable iron unit at least partially locates between the third magnet and the fourth magnet; a side of the second coil away from the first coil respectively corresponds to the third magnet and the fourth magnet; and an opening direction of the first magnetic conductive piece is opposite to an opening direction of the second magnetic conductive piece.

5. The speakers as described in claim 4, wherein the first coil locates within the first magnetic conductive piece, and the second coil locates within the second magnetic conductive piece.

6. The speaker as described in claim 4, wherein a magnetization direction of the first magnet is the same as that of the second magnet, and a magnetization direction of the third magnet is the same as that of the fourth magnet; the magnetization direction of the first magnet is opposite to that of the third magnet.

7. The speaker as described in claim 1, further comprising two suction compensation mechanisms arranged opposite to each other, wherein the two suction compensation mechanisms are fixed at both ends of the housing, and the two suction compensation mechanisms respectively corresponds to the first magnetic structure and the second magnetic structure.

8. The speaker as described in claim 7, wherein the suction compensation mechanism comprises an U-shaped fixing piece separated by the first magnetic structure, a central magnet fixed to the fixing piece, a magnetic conductive connecting piece fixed to the central magnet near one side of the first magnetic structure, and a fifth and a sixth magnets fixed respectively to the fixing piece and spaced apart and aligned with each other; the fifth and sixth magnets are located on both sides of the central magnet, the magnetic conductive connecting piece passes through the first magnetic structure and is fixedly connected to the magnetic diaphragm; a magnetization direction of the central magnet is opposite to the magnetization direction of the fifth magnet and the magnetization direction of the sixth magnet.

9. The speaker as described in claim 1, further comprising a first magnetic conductive element and a second magnetic conductive element, wherein the first magnetic conductive element is laminated and fixed to one end of the first moving iron unit near the first magnetic structure, the second magnetic conductive element is laminated and fixed to one end of the second moving iron unit near the second magnetic structure; the first magnetic conductive element, the second magnetic conductive element, the first moving iron unit, and the second moving iron unit cooperatively form a dumbbell-shaped structure.

10. The speaker as described in claim 1, further comprising a third magnetic conductive element perpendicular to the first movable iron unit, and a fourth magnetic conductive element perpendicular to the second movable iron unit, wherein the third magnetic conductive element locates between the first coil and the first magnetic structure, the fourth magnetic conductive element locates between the second coil and the second magnetic structure; the third magnetic conductive element and the first movable iron unit together form a cross structure; and the fourth magnetic conductive element and the second movable iron unit together form another cross structure.

* * * * *